United States Patent
Imaida (10) Patent No.: US 10,507,937 B2
(45) Date of Patent: Dec. 17, 2019

(54) OPERATION STATE RECORDING SYSTEM AND OPERATION STATE RECORDING METHOD

(71) Applicant: MITSUBISHI HEAVY INDUSTRIES, LTD., Tokyo (JP)

(72) Inventor: Takashi Imaida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 61 days.

(21) Appl. No.: 15/616,231

(22) Filed: Jun. 7, 2017

(65) Prior Publication Data
US 2017/0355468 A1 Dec. 14, 2017

(30) Foreign Application Priority Data
Jun. 14, 2016 (JP) .................. 2016-117821

(51) Int. Cl.
*B64D 45/00* (2006.01)
*G07C 5/08* (2006.01)

(52) U.S. Cl.
CPC ............. *B64D 45/00* (2013.01); *G07C 5/085* (2013.01); *B64D 2045/0085* (2013.01)

(58) Field of Classification Search
CPC . B64D 45/00; B64D 2045/0085; G07C 5/085
See application file for complete search history.

(56) References Cited

U.S. PATENT DOCUMENTS

| | | | |
|---|---|---|---|
| 2006/0112119 A1* | 5/2006 | Vian | G07C 5/085 |
| 2016/0188525 A1* | 6/2016 | Graffy | G06F 13/4286 |
| | | | 710/315 |
| 2016/0196696 A1* | 7/2016 | Pereira | G07C 5/008 |
| | | | 701/31.4 |
| 2018/0273199 A1* | 9/2018 | Harrington | B64C 13/50 |

FOREIGN PATENT DOCUMENTS

JP 58-37712 3/1983
JP 2002-304217 10/2002

* cited by examiner

*Primary Examiner* — Hussein Elchanti
(74) *Attorney, Agent, or Firm* — Wenderoth, Lind & Ponack, L.L.P.

(57) ABSTRACT

An operation state recording system is provided in a target device including: an input unit; a device group; and a control system controlling the device group based on an input of the input unit. The operation state recording system records an operation state from a start to a stop of an operation of the target device, and the control system includes: a plurality of control devices controlling a plurality of devices; nonvolatile storage units where the operation state of the target device is recorded as operation history information; and a time measuring unit measuring a time.

7 Claims, 5 Drawing Sheets

OPERATION STATE RECORDING SYSTEM AND OPERATION STATE RECORDING METHOD

CROSS-REFERENCE TO RELATED APPLICATION

The present application claims priority to and incorporates by reference the entire contents of Japanese Patent Application No. 2016-117821 filed in Japan on Jun. 14, 2016.

FIELD

The present invention relates to an operation state recording system and an operation state recording method for recording an operation state of a target device.

BACKGROUND

Conventionally, a control system with an ECU including a nonvolatile memory that stores failure information is known (for example, refer to Patent Literature 1). In this control system, self-diagnosis of system components is performed by the BIT function of the ECU. When an abnormality is detected in the system components as a result of the self-diagnosis, the failure information is stored in the nonvolatile memory.

Further, a plant operation information recording method is known which records plant operation information before and after an abnormality of a plant occurs when the abnormality occurs during a normal operation of the plant (for example, refer to Patent Literature 2).

CITATION LIST

Patent Literature

Patent Literature 1: Japanese Laid-open Patent Publication No. 2002-304217 A
Patent Literature 2: Japanese Laid-open Patent Publication No. 58-037712 A

SUMMARY

Technical Problem

As described above, in the control system of Patent Literature 1 and a device such as the plant of Patent Literature 2, when an abnormal event such as a failure or an abnormality occurs during operation of the device, information regarding the operation state of the device at the time of the abnormal event, such as a failure information or a plant operation information, is recorded.

Meanwhile, as the target device in which the operation state is recorded, there is a device to be tested which is subjected to various tests, for example. In the device to be tested, for example, a predetermined work procedure for simulatingly generating an abnormal event (hereinafter, referred to as an abnormality-generating work procedure) is performed. In the device to be tested, the abnormality-generating work procedure is performed to confirm whether the device to be tested is appropriately performing an operation with regard to the abnormal event when the abnormal event occurs. In this case, the operation of the device to be tested may be influenced by previous work procedures other than the abnormality-generating work procedure. In this case, when the abnormality-generating work procedure is performed, the device to be tested may not perform the operation with regard to the abnormal event appropriately due to the influence of the previous work procedures. In this case, it is necessary to determine (troubleshoot) the reason why the device to be tested does not perform the operation with regard to the abnormal event appropriately.

However, in Patent Literature 1 or Patent Literature 2, it is not possible to grasp the previous operation state of the device since the operation state of the device only at the time of occurrence of the abnormal event is recorded. For this reason, it is difficult to determine (troubleshoot) the reason why the device to be tested does not perform the operation with regard to the abnormal event appropriately.

Therefore, the present invention aims to provide an operation state recording system and an operation state recording method capable of appropriately grasping the operation state of the target device in a time-series manner.

Solution to Problem

An operation state recording system according to the present invention provided in a target device includes an input unit, a plurality of devices, and a control system that controls each of the devices based on an input of the input unit, the operation state recording system recording an operation state from a start to a stop of an operation of the target device. The control system includes a plurality of control devices that controls the plurality of devices, a nonvolatile storage device in which the operation state of the target device is recorded as operation history information, and a time measuring unit that measures a time. The control device records the operation state of the target device in association with the time acquired from the time measuring unit, as the operation history information, in the nonvolatile storage device when the operation state of the target device changes.

Furthermore, an operation state recording method according to the present invention for recording an operation state from a start to a stop of an operation of a target device including an input unit, a plurality of devices, and a control system that controls each of the devices based on an input of the input unit, includes an operation state detection step of detecting whether the operation state of the target device has changed or not, an operation state acquisition step of acquiring the operation state of the target device when it is detected that the operation state of the target device has changed in the operation state detection step, a time acquisition step of acquiring a time when the operation state of the target device changes, and an operation history recording step of recording operation history information obtained by associating the operation state acquired in the operation state acquisition step with the time acquired in the time acquisition step.

According to these configurations, the operation state from the start to the stop of the operation of the target device can be associated with time and recorded as operation history information. Therefore, the operation state of the target device may be grasped appropriately in the time-series manner by arranging the recorded operation history information in the time-series manner. Therefore, for example, even when an abnormal event occurs in the target device and the target device does not appropriately perform an operation with regard to the abnormal event, the previous operation history information before the occurrence of the abnormal event, in addition to the operation history information at the occurrence of the abnormal event, can be acquired, whereby it is possible to troubleshoot appropriately. The target device is, for example, transport equipment, and may include an aircraft, an automobile, a railroad vehicle, and a vessel. Further, the target device is, for example, a device to be tested which is subjected to various tests. Further, the control system may be an integral part which also serves as an operation state recording system or the control system may be separated from the operation state recording system, and its configuration is not particularly limited. In addition, the operation state of the target device includes an operation state of an input unit, an operation state of the control system, and an operation state of the device.

Furthermore, it is preferable that the control device does not record the operation state of the target device in the nonvolatile storage device in a steady state of the operation state of the target device.

According to this configuration, since the operation state of the target device in a steady state is not recorded in a nonvolatile storage device, an amount of information recorded in the nonvolatile storage device can be suppressed. Thus, a storage capacity of the nonvolatile storage device can be reduced.

Furthermore, it is preferable that the control device detects a change in the operation state of the target device based on a binarized state value.

According to this configuration, the detection related to a change in the operation state of the target device can be a simple detection process. Examples of the binarized state value include an ON/OFF state of the device, whether or not the state value exceeds the threshold value, whether or not the operation mode is switched, and the like.

Furthermore, it is preferable that the control device records the operation state of the input unit as the operation history information, together with the operation state of the device associated with the input unit, in the nonvolatile storage device.

According to this configuration, it is possible to record the operation state of the input unit, for example, an ON/OFF of an operation switch as the operation history information as well as the operation state of the device associated with the input unit as the operation history information, whereby it is easy to grasp the operation state of the target device. Therefore, it is possible to easily identify a cause of a trouble when the trouble occurs in the target device.

Furthermore, it is preferable that the nonvolatile storage device is a nonvolatile storage unit provided in each of the plurality of control devices and stored inside the control device.

According to this configuration, even when one of the control devices stops operating, it is possible to record the operation state of the control device that has stopped operating by another control device.

Furthermore, it is preferable that the time measuring unit includes at least one of a clock counter that counts the number of clocks of an operating unit provided in the control device, a power counter that counts each time a power source of the device is turned on and off, and a timer that counts hours.

According to this configuration, the clock counter, the power counter, and the timer are combined appropriately, whereby an accuracy of a time measurement obtained by a time measuring unit can be increased.

Furthermore, it is preferable that the target device is an aircraft.

According to this configuration, it is possible to record an operation state of the aircraft as the operation history information. Therefore, even when a trouble occurs in the aircraft, it is possible to perform a troubleshooting appropriately, based on the previous operation history information.

DESCRIPTION OF EMBODIMENTS

Embodiments of the present invention will be described in detail below with reference to the drawings. It should be noted that the present invention is not limited by the embodiments. Constituent elements in the following embodiments include those which may be or is easily replaced by the person skilled in the art or which are substantially the same. Further, the constituent elements described below may be appropriately combined, and, when there are a plurality of embodiments, it is also possible to combine the respective embodiments.

First Embodiment

Figure 1:
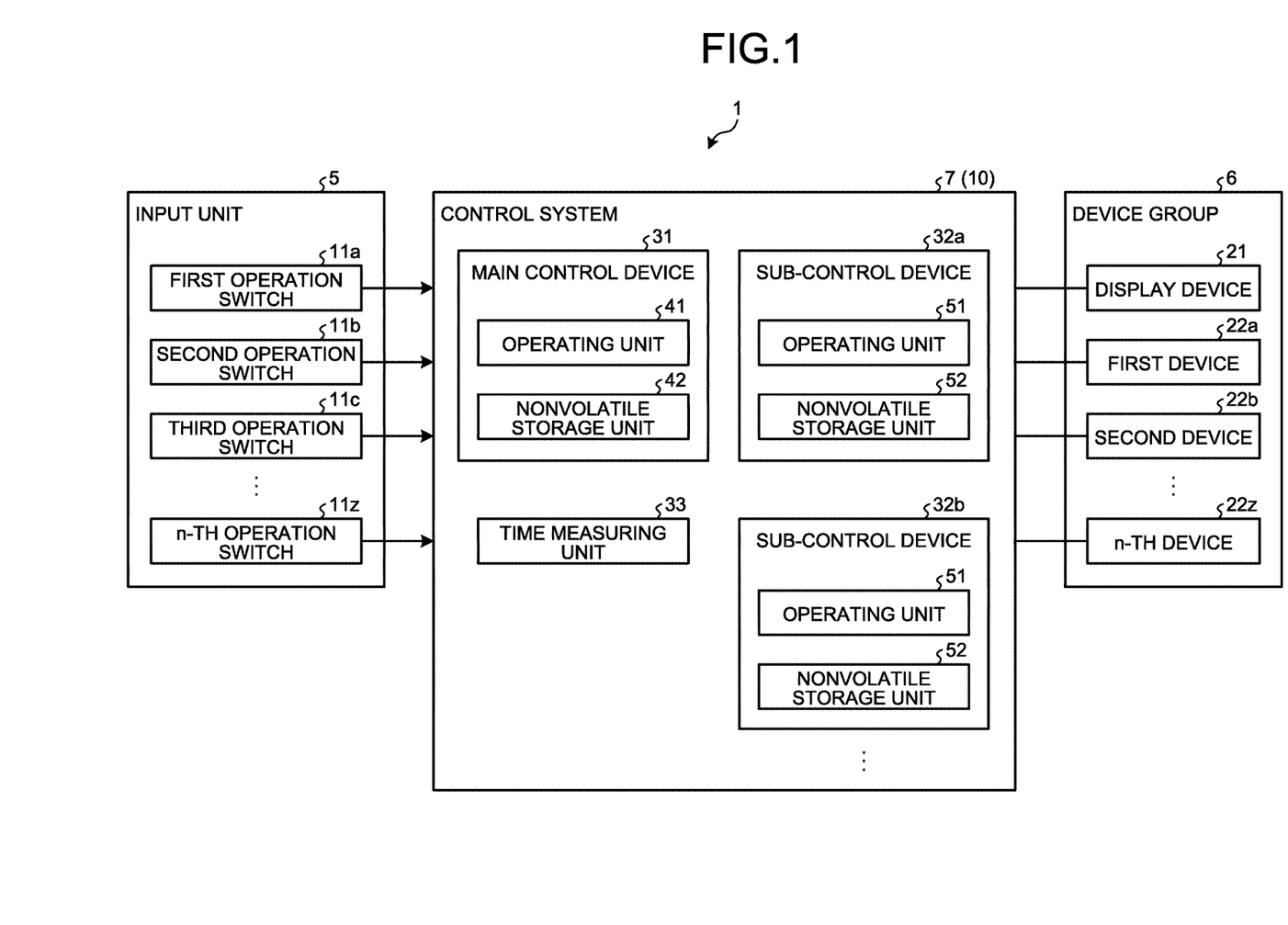
FIG. 1 is an explanatory diagram illustrating a control block of a target device including an operation state recording system according to a first embodiment.

FIG. 1 is an explanatory diagram illustrating a control block of a target device including an operation state recording system according to a first embodiment.

Figure 2:
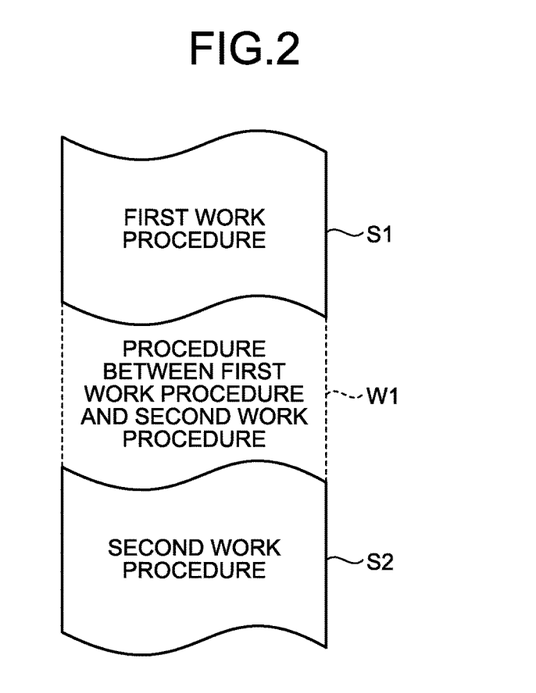
FIG. 2 is an explanatory diagram of a work procedure performed on the target device.
Figure 3:
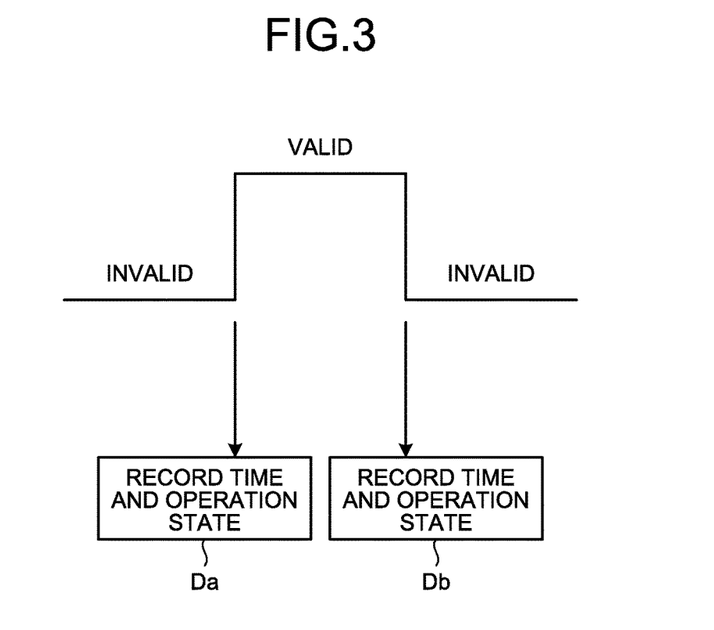
FIG. 3 is an explanatory diagram concerning a change in an operation state of the target device.
Figure 4:
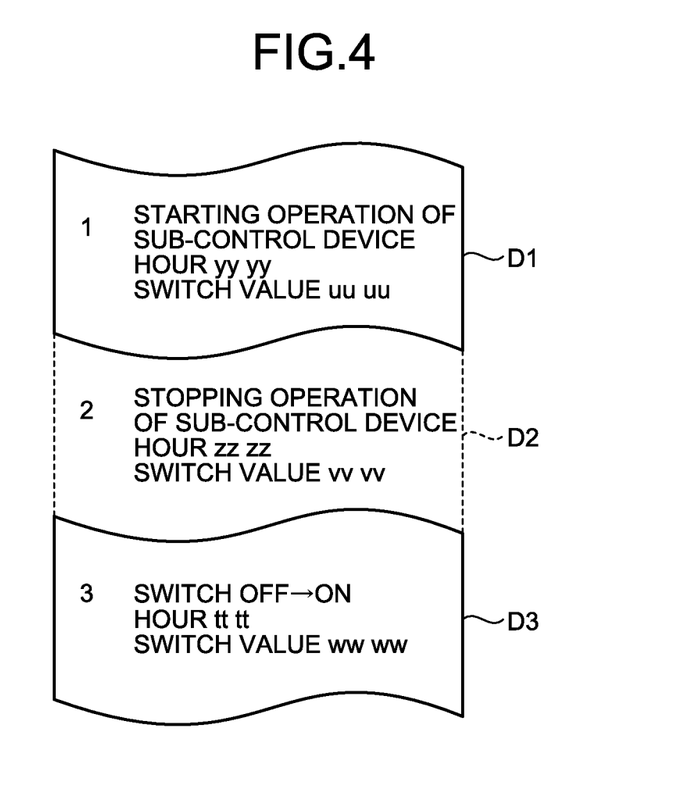
FIG. 4 is an explanatory diagram concerning operation history information.
Figure 5:
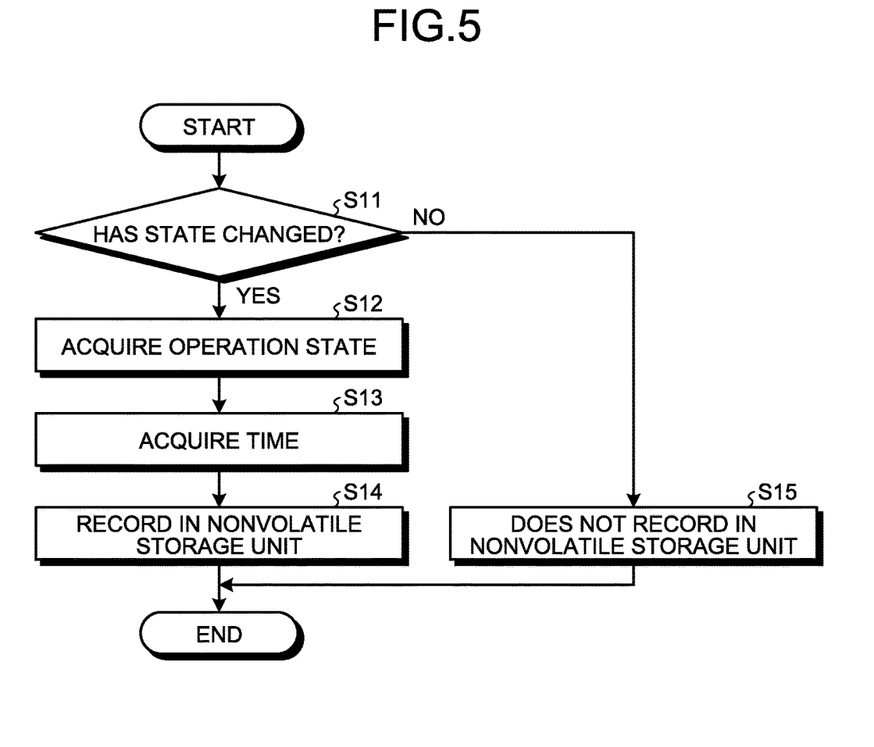
FIG. 5 is a flowchart illustrating an example of a control operation related to an operation state recording method according to the first embodiment.

FIG. 2 is an explanatory diagram of a work procedure performed on the target device. FIG. 3 is an explanatory diagram concerning a change in an operation state of the target device. FIG. 4 is an explanatory diagram concerning operation history information. FIG. 5 is a flowchart illustrating an example of a control operation related to an operation state recording method according to the first embodiment.

A target device 1 in which the operation state is recorded by an operation state recording system 10 according to the first embodiment will be described. The target device 1 is, for example, transport equipment such as an aircraft, and is particularly applied to a machine to be tested as a device to be tested. Further, the operation state recording system 10 is incorporated in the target device 1, and a control system 7 described later functions as the operation state recording system 10. In the first embodiment, the machine to be tested is described as the target device 1, but the present invention is not particularly limited.

Since the target device 1 is the device to be tested, a plurality of work procedures for performing respective tests are performed, as illustrated in FIG. 2.

Here, in a case where a first work procedure S1 as a previous operation and a second work procedure S2 as a subsequent operation are performed by the target device 1, another procedure W1 may be performed between the first work procedure S1 and the second work procedure S2 in some cases. The first work procedure S1 and the second work procedure S2 are performed in accordance with a predefined procedure, but, on the other hand, the procedure W1 is not a predefined procedure. In the target device 1, the result obtained by performing the second work procedure S2 may be influenced by the procedure W1. Here, in a case where the second work procedure S2 is, for example, a predetermined work procedure for simulatingly generating an abnormal event, if the second work procedure S2 is performed, the target device 1 performs an operation with regard to the abnormal event. However, due to the influence of the procedure W1, there may be a trouble that the target device 1 does not perform the operation with regard to the abnormal event appropriately.

Referring again to FIG. 1, the target device 1 will be described. The target device 1 includes an input unit 5, a device group 6 including a plurality of devices 21 and 22a to 22z, and the control system 7 controlling the device group 6 based on an input of the input unit 5.

The input unit 5 includes a plurality of input devices and outputs an input signal corresponding to an operation performed on the input device to the control system 7. The input unit 5 includes, for example, a plurality of first to n-th operation switches 11a to 11z as the input device. As for the input unit 5, an appropriate input device is applied depending on a type of the target device 1.

For example, the device group 6 includes, as the plurality of devices, the display device 21 and the plurality of first to n-th devices 22a to 22z. The devices 22a to 22z are, for example, actuators and the like. The device group 6 performs an operation corresponding to an output signal output from the control system 7 and outputs an operation signal which is information on an operation state of each device to the control system 7. Further, as for the device group 6, an appropriate device is applied depending on the type of the target device 1.

An input signal from the input unit 5 and an operation signal of each device from the device group 6 are input to the control system 7. Further, the control system 7 generates a control signal for controlling the device group 6 based on the input signals, and outputs the generated control signal, as an output signal, to the device group 6. In addition, the control system 7 also functions as the operation state recording system 10 for recording the operation state of the target device 1.

The control system 7 includes a plurality of control devices 31, 32a, 32b, . . . , (Hereinafter, the points refer to omission) and a time measuring unit 33. In addition, the plurality of control devices 31, 32a, and 32b are configured to have redundancy, and are configured to include the main control device 31 and the plurality of sub-control devices 32a and 32b. Further, as for the control system 7, an appropriate system is constructed depending on the type of the target device 1.

The main control device 31 generally controls the entire control system 7, and includes an operating unit 41 and a nonvolatile storage unit 42. The operating unit 41 includes an integrated circuit such as a CPU (Central Processing Unit) and a memory serving as a work area. Using these hardware resources, the operating unit 41 executes a process of controlling the operation of the device group 6 or records the operation state of the device group 6. Further, when the CPU is applied as the operating unit 41, a clock counter that counts a number of clocks (processing cycles) is incorporated in the CPU, and the clock counter forms a part of the time measuring unit 33. The nonvolatile storage unit 42 is a nonvolatile storage device such as a magnetic storage device or a semiconductor storage device, and the data stored in the nonvolatile storage unit 42 includes operation history information that is the data on the operation state of the device group 6. The nonvolatile storage unit 42 is a ring buffer, which always records the latest information, deleting the old information.

The plurality of sub-control devices 32a and 32b are provided corresponding to each device of the device group 6, and are capable of individually controlling the corresponding devices. Like the main control device 31, each of the sub-control devices 32a and 32b includes an operating unit 51 and a nonvolatile storage unit 52. Since the operating unit 51 and the nonvolatile storage unit 52 are the same as the operating unit 41 and the nonvolatile storage unit 42, the description thereof will be omitted.

The time measuring unit 33 measures time, and is configured to include a clock counter, a power counter, and a timer. As described above, the clock counter is incorporated in the operating unit 41 and counts the number of clocks. The power counter is counted up (incremented) each time a power source of the device is turned ON/OFF. The timer counts hours, and for example, a GPS watch or the like is used. Based on the information obtained from the clock counter, the power counter, and the timer, the time measuring unit 33 acquires the time and outputs the time acquired according to a request from each of the control devices 31, 32a, and 32b.

When the control system 7 functions as the operation state recording system 10, each of the control devices 31, 32a, and 32b acquires operation signals of the target device 1 when the operation state of the target device 1 changes, and record them in the nonvolatile storage units 42 and 52 as operation history information in association with the time acquired from the time measuring unit 33. Further, the control system 7 continues recording the operation history information until the operation of the target device 1 is stopped after the operation starts.

Here, with reference to FIG. 3, the change in the operation state of the target device 1 will be described. FIG. 3 illustrates an operation signal indicating an operation state of each of the devices 22a to 22z as the operation state of the target device 1, and the operation signal is obtained in each of the sub-control devices 32a and 32b. As illustrated in FIG. 3, the operation signal is a binarized state value, and includes a state value in an invalid state of "INVALID" and a state value in a valid state of "VALID." The sub-control devices 32a and 32b detect the change in the operation state of each of the devices 22a to 22z based on the binarized state value.

In other words, when the state value changes from the invalid state to the valid state, the sub-control devices 32a and 32b acquire the state values of the devices 22a to 22z, and also acquire the time when the state value changes from the invalid state to the valid state from the time measuring unit 33. Then, the sub-control devices 32a and 32b associate the acquired time with the acquired state values (operation states) of the devices 22a to 22z to generate operation history information Da and record the generated operation history information Da in the nonvolatile storage unit 52. Further, when the state value changes from the valid state to the invalid state, the sub-control devices 32a and 32b acquire the state values of the devices 22a to 22z and also acquire the time when the state value changes from the valid state to the invalid state from the time measuring unit 33. Then, the sub-control devices 32a and 32b associate the acquired time with the acquired state values (operation states) of the devices 22a to 22z to generate operation history information Db and record the generated operation history information Db in the nonvolatile storage unit 52.

On the other hand, the sub-control devices 32a and 32b do not record the operation states of the devices 22a to 22z in a steady state of an operation state in which the invalid state or the valid state continues.

The change in the operation state of the target device 1 is an example, and the operation state of the target device 1 may include an operation state of the input unit 5 and an operation state in the control system 7, in addition to the operation states of the devices 22a to 22z. For example, a binarized state as the operation state of the input unit 5 is an ON/OFF operation or the like of the operation switches 11a to 11z. Further, in the above description, the control operation related to the sub-control devices 32a and 32b has been described, but the same control operation may be executed also in the main control device 31. For example, operation signals of the sub-control devices 32a and 32b are input to the main control device 31.

Further, when recording the operation state of the input unit 5 as the operation history information Da and Db in the nonvolatile storage unit 52, the sub-control devices 32a and 32b may also record the operation states of the devices 22a to 22z associated with the input unit 5 in the nonvolatile storage unit 52. In this case, the operation states of the devices 22a to 22z highly related to the operation switches 11a to 11z may also be stored in the nonvolatile storage unit 52 as the operation history information Da and Db.

Next, with reference to FIG. 4, the operation history information recorded in the nonvolatile storage units 42 and 52 will be described. When the operator's operation is input via the input unit 5, the control system 7 arranges a plurality of operation history information D1 to D3 recorded in each of the nonvolatile storage units 42 and 52 in time-series order and displays them on the display device 21 of the device group 6. The operation history information D1 includes, for example, information on the operation states (operation start states) of the sub-control devices 32a and 32b, a time (hour), and a switch value as the operation state of the input unit 5. The operation history information D2 includes, for example, information on the operation states (operation stop states) of the sub-control devices 32a and 32b, a time (hour), and the switch value as the operation state of the input unit 5. The operation history information D3 includes, for example, information on the operation state (OFF→ON) of the operation switches 11a to 11z of the input unit 5, a time (hour), and a switch value as an operation state of the input unit 5. The operation history information D1 to D3 illustrated in FIG. 4 is used for troubleshooting when a trouble occurs in the target device 1.

Next, with reference to FIG. 5, a series of control operations concerning the operation state recording method by the control system 7 configured as described above will be described. The control operation illustrated in FIG. 5 is repeatedly executed in the control system 7.

As illustrated in FIG. 5, firstly, the control system 7 detects whether or not the operation state of the target device 1 has changed based on the input operation signal (step S11: an operation state detection step). Upon detecting that the operation state of the target device 1 has changed (step S11: Yes), the control system 7 acquires information on the operation state of the target device 1 (step S12: an operation state acquisition step).

Thereafter, the control system 7 acquires the time when the operation state of the target device 1 changes, from the time measuring unit 33 (step S13: a time acquisition step). Then, the control system 7 generates the operation history information Da, Db, and D1 to D3 by associating the operation state acquired in the operation state acquisition step (S12) with the time acquired in the time acquisition step (S13), and records the generated operation history information Da, Db, and D1 to D3 in the nonvolatile storage units 42 and 52 (step S14: an operation history recording step). Thereafter, the series of control operations is terminated.

In addition, when detecting that the operation state of the target device 1 is not changed (step S11: No) in the operation state detection step S11, the control system 7 terminates the series of control operations, without recording the operation state of the target device 1 in the nonvolatile storage units 42 and 52 (step S15).

As described above, according to the first embodiment, the operation state from the start to the stop of operation of the target device 1 may be recorded as the operation history information Da, Db, and D1 to D3 in association with the time. Therefore, by arranging the recorded operation history information Da, Db, and D1 to D3 in a time-series manner, it is possible to appropriately grasp the operation state of the target device 1 in the time-series manner. Therefore, for example, even when a trouble occurs in the target device 1, it is possible to acquire the operation history information Da, Db, and D1 to D3 from the start to the stop of operation of the target device 1. Therefore, it is possible to perform the troubleshooting appropriately.

Further, according to the first embodiment, since the operation state in the steady state of the target device 1 is not recorded in the nonvolatile storage units 42 and 52, it is possible to suppress an amount of information stored in the nonvolatile storage units 42 and 52 and accordingly reduce a storage capacity of the nonvolatile storage units 42 and 52.

Further, according to the first embodiment, the change in the operation state of the target device 1 is detected based on the binarized state value, whereby a simple detection process may be achieved.

Further, according to the first embodiment, since the operation states of the devices 22a to 22z associated with the input unit 5, together with the operation state of the input unit 5, can also be recorded as the operation history information Da, Db, and D1 to D3, the operation state of the target device 1 can be easily grasped. Therefore, when a trouble occurs in the target device 1, it is possible to easily identify a cause of the trouble.

Further, according to the first embodiment, the nonvolatile storage unit 42 may be provided in each of the plurality of control devices 31, 32a, and 32b. Therefore, even when one of the control devices 31, 32a, and 32b stops operating, the others of the control devices 31, 32a, and 32b may record an operation state of the one of the control devices 31, 32a, and 32b whose operation is stopped.

Further, according to the first embodiment, since the time measuring unit 33 includes the clock counter, the power counter, and the timer, the time measuring unit 33 can measure the time more accurately by appropriately combining them.

Further, according to the first embodiment, it is possible to record the operation state of the aircraft as the operation history information Da, Db, and D1 to D3 by applying the aircraft as the target device 1. Therefore, even if a trouble occurs in the aircraft, it is possible to appropriately troubleshoot from the previous operation history information Da, Db, and D1 to D3.

In the first embodiment, the operation state recording system 10 is integrated into the control system 7, but the operation state recording system 10 may be configured to be separate from the control system 7.

Second Embodiment

Figure 6:
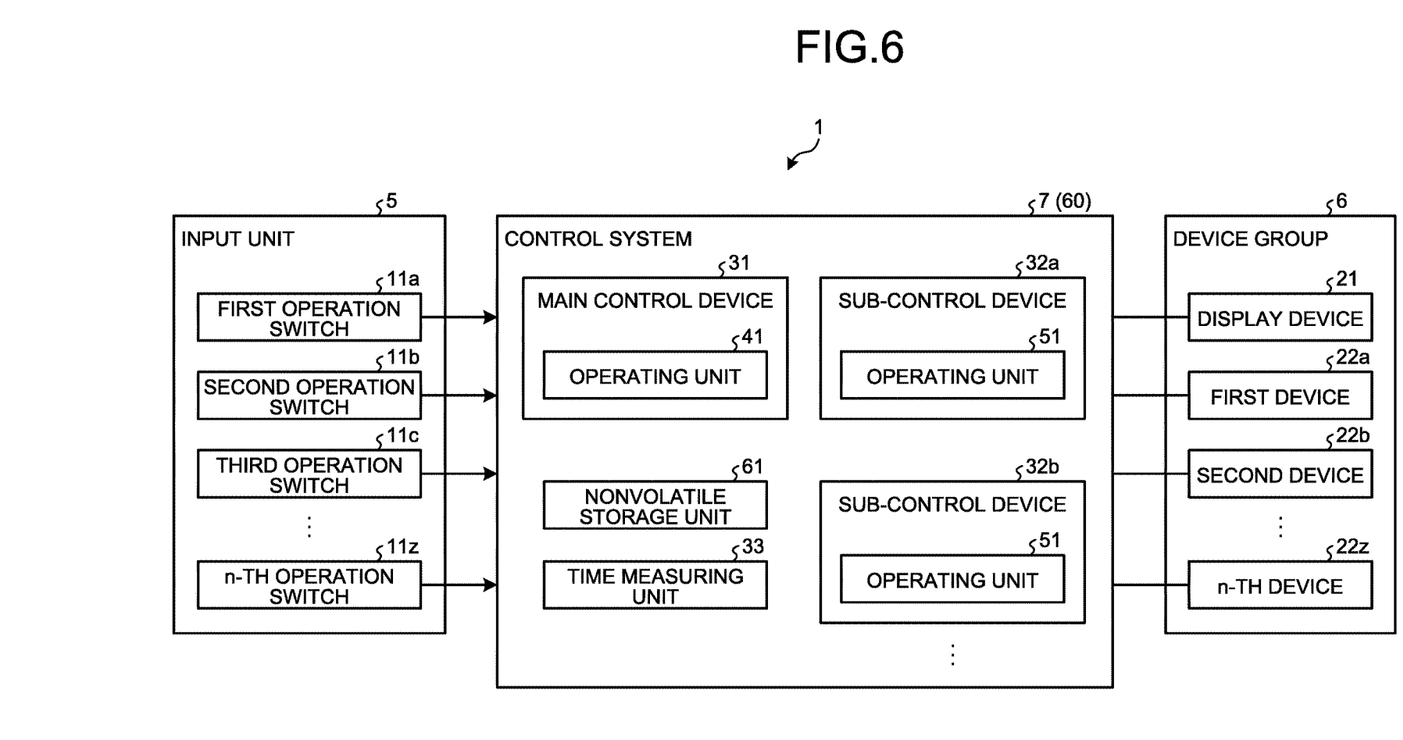
FIG. 6 is an explanatory diagram illustrating a control block of a target device including an operation state recording system according to a second embodiment.

Next, referring to FIG. 6, an operation state recording system 60 according to a second embodiment will be described. In the second embodiment, parts different from the first embodiment will be described and portions having the same configuration as in the first embodiment will be described with the same reference numerals in order to avoid redundant description. FIG. 6 is an explanatory diagram illustrating a control block of a target device including the operation state recording system according to the second embodiment.

The operation state recording system 60 of the second embodiment is incorporated in the control system 7 as in the first embodiment, while the nonvolatile storage units 42 and 52 provided in the plurality of control devices 31, 32*a*, and 32*b* in the first embodiment are omitted and a nonvolatile storage unit 61 is provided outside the plurality of control devices 31, 32*a*, and 32*b*.

A plurality of control devices 31, 32*a*, and 32*b* are connected to the nonvolatile storage unit 61, and operation history information Da, Db, and D1 to D3 are recorded by the plurality of control devices 31, 32*a*, and 32*b*.

As described above, according to the second embodiment, it is not necessary to provide the nonvolatile storage units 42 and 52 in each of the plurality of control devices 31, 32*a*, and 32*b* as in the first embodiment. Therefore a simple configuration may be achieved.

The invention claimed is:

1. An operation state recording system provided in a target device including: an input unit; a display device; a plurality of devices; and a control system that controls each of the devices based on an input of the input unit, the operation state recording system recording an operation state from a start to a stop of an operation of the target device, and the control system comprising:
   a plurality of control devices that controls the plurality of devices;
   a nonvolatile storage device in which the operation state of the target device is recorded as operation history information; and
   a time measuring unit that measures a time when the operation state of the target device changes,
   wherein the control device records the operation state of the target device in association with the time acquired from the time measuring unit, as the operation history information, in the nonvolatile storage device when the operation state of the target device changes,
   wherein the control device arranges the operation history information recorded in the nonvolatile storage units in time-series order and displays the operation history information on the display device,
   wherein the control device does not record the operation state of the target device in the nonvolatile storage device in a steady state of the operation state of the target device.

2. The operation state recording system according to claim 1, wherein the control device detects a change in the operation state of the target device based on a binarized state value.

3. The operation state recording system according to claim 1, wherein the control device records the operation state of the input unit as the operation history information, together with the operation state of the device associated with the input unit, in the nonvolatile storage device.

4. The operation state recording system according to claim 1, wherein the nonvolatile storage device is a nonvolatile storage unit provided in each of the plurality of control devices and stored inside the control device.

5. The operation state recording system according to claim 1, wherein the time measuring unit includes at least one of:
   a clock counter that counts the number of clocks of an operating unit provided in the control device;
   a power counter that counts each time a power source of the device is turned on and off; and
   a timer that counts hours.

6. The operation state recording system according to claim 1, wherein the target device is an aircraft.

7. An operation state recording method for recording an operation state from a start to a stop of an operation of a target device including an input unit, a display device, a plurality of devices, and a control system that controls each of the devices based on an input of the input unit, the method comprising:
   an operation state detection step of detecting whether the operation state of the target device has changed or not;
   an operation state acquisition step of acquiring the operation state of the target device when it is detected that the operation state of the target device has changed in the operation state detection step;
   a time acquisition step of acquiring a time when the operation state of the target device changes;
   an operation history recording step of recording operation history information obtained by associating the operation state acquired in the operation state acquisition step with the time acquired in the time acquisition step; and
   an operation history displaying step of displaying the operation history information in time-series order,
   wherein in the operation history recording step, the operation state of the target device is not recorded in the nonvolatile storage device in a steady state of the operation state of the target device.

* * * * *